United States Patent [19]

Ledley

[11] Patent Number: 4,798,210

[45] Date of Patent: Jan. 17, 1989

[54] THREE-DIMENSIONAL IMAGING SYSTEM

[75] Inventor: Robert S. Ledley, Silver Spring, Md.

[73] Assignee: National Biomedical Research Foundation, Washington, D.C.

[21] Appl. No.: 913,065

[22] Filed: Sep. 29, 1986

Related U.S. Application Data

[63] Continuation-in-part of Ser. No. 594,277, Mar. 28, 1984, Pat. No. 4,747,411.

[51] Int. Cl.$^4$ ............................................. A61B 10/00
[52] U.S. Cl. ................................ 128/660.01; 73/619; 73/621; 358/88
[58] Field of Search .................. 128/660; 73/618–621, 73/625, 628, 633, 626; 364/413–415; 358/88, 91, 92

[56] References Cited

U.S. PATENT DOCUMENTS

| | | | |
|---|---|---|---|
| 3,705,261 | 12/1972 | Langley | 358/88 |
| 3,794,964 | 2/1974 | Katakura . | |
| 4,159,462 | 6/1979 | Rocha et al. | 73/626 |
| 4,271,706 | 6/1981 | Ledley | 73/614 |
| 4,543,960 | 10/1985 | Harui et al. | 128/660 |
| 4,653,000 | 3/1987 | Matsumoto | 128/660 |

FOREIGN PATENT DOCUMENTS 2850251  5/1979  Fed. Rep. of Germany ...... 128/660

OTHER PUBLICATIONS

Nakatani et al., "A Binocular Stereoscopic Display System for Echocardiography", IEEE Transactions on Biomedical Engineering, vol. BME 26, No. 2, Feb. 1979, pp. 65–68.

Primary Examiner—Ruth S. Smith
Attorney, Agent, or Firm—Joseph G. Seeber

[57] ABSTRACT

A three-dimensional imaging system for obtaining a three-dimensional image of an object being scanned ultrasonically comprises a source arrangement for sequentially transmitting ultrasonic energy toward the object in successive directions in a first scanning plane, followed by sequential transmission of ultrasonic energy toward the object in successive directions in successive scanning planes, a detector arrangement for receiving reflected energy and converting the reflected energy to electrical signals, and a processor for processing the electrical signals to develop reconstructed image data of the object, the reconstructed image data comprising forward projections of the object into a left image plane and a right image plane to form left and right images, respectively, the left and right images forming a stereo pair for composite display by a display unit. In one embodiment, each successive scanning plane is parallel to the first scanning plane. In a further embodiment, successive scanning planes have increasing angular orientations, measured at the point of ultrasonic transmission, with respect to the first scanning plane. In another embodiment, successive scanning planes have increasing angular orientations, measured along a common axis, with respect to the first scanning plane.

9 Claims, 12 Drawing Sheets

THREE-DIMENSIONAL IMAGING SYSTEM

REFERENCE TO RELATED APPLICATION

This is a continuation-in-part of U.S. Ser. No. 594,277 filed on Mar. 28, 1984 now U.S. Pat. No. 4,747,411.

1. Technical Field

The present invention relates to a three-dimensional imaging system for obtaining a three-dimensional image of an object. In particular, the invention relates to a three-dimensional ultrasound imaging system for obtaining a three-dimensional image of an object scanned using ultrasound scanning techniques disclosed below.

2. Background Art

Ultrasound scanning systems of various types are well-known in the prior art. For example, most prior art medical ultrasound scanning systems generally utilized may be classified as A-type or B-type.

In an A-type ultrasound scanner, a fixed transducer provides an ultrasound pulse which is directed along a fixed path into a body or object. The times of return for reflections from internal organic interfaces are detected to provide an indication of the distance to such interfaces.

In a B-type scanner, a pulsed ultrasonic beam is swept in a single direction, and, as in the A-type scanner, the successive distances or ranges to reflecting organic interfaces are determined by standard intervalometer methods. These B-type scanners typically provide an indicia of the interface by, in effect, plotting the detected distances against the position of the beam path. Various B-type scanners have included a real-time display, and have effected scanning electrically, for example, by use of a phased transducer array.

U.S. Pat. No. 4,271,706—Ledley discloses an ultrasonic scanner in which an ultrasonic pulse is directed into a body and electrical representations of pulse reflections from body interfaces, along the path of the ultrasonic pulse, are generated. In the ultrasonic scanner of that patent, the ultrasonic signal path is scanned through a volume of the body, and position signals indicative of the instantaneous position are generated. The reflection signals are selectively gated in accordance with a predetermined function of the path disposition to provide a display selectively representing desired interfaces situated within a selected contoured portion of the volume being scanned. By varying the predetermined function, a specific desired interface surface may be displayed. Provisions for developing a three-dimensional display of the selected surface are described in the aforementioned patent.

Other methods and devices for representing electrical spatial curves and spatial images of electrically reproduced ultrasonic images, X-ray images or cardiac vector loops, as well as an apparatus for collecting three-dimensional data relating to the size, shape, location and nature of soft tissue organ structures, are disclosed in U.S. Pat. No. 4,292,977—Krause et al, U.S. Pat. No. 4,100,916—King, and U.S. Pat. No. Re. 30,397—King. In addition, an ultrasonic stereoscopic imaging device or apparatus for three-dimensional visualization of an object or substance is disclosed in U.S. Pat. No. 4,028,934—Sollish.

Arrangements involving arrays of transducers, or of ultrasonic transmitters and/or receivers, are disclosed in U.S. Pat. No. 3,292,018—Clynes, U.S. Pat. No. 3,552,382—Mount, and U.S. Pat. No. 3,577,772—Perilhou et al.

The following U.S. patents disclose other ultrasonic systems and devices: U.S. Pat. Nos. 3,681,977—Wendt et al; 3,888,238—Meindl et al; 3,936,791—Kossoff; 3,964,296—Matzuk; 4,075,883—Glover; 4,109,642—Reid et al; and 4,121,468—Glover et al.

Further prior art arrangements are disclosed in the following patents and articles: U.S. Pat. No. 4,159,462—Rocha et al; U.S. Pat. No. 4,486,076—Jaenzer; U.S. Pat. No. 4,412,249—Carmen; U.S. Pat. No. 4,398,422—Haerten; U.S. Pat. No. 4,258,574—Hildebrand et al; U.S. Pat. No. 4,322,974—Abele; U.S. Pat. No. 4,456,982—Tournois; U.S. Pat. No. 4,486,076—Taenzer; U.K. patent application No. 2,053,476A; German Pat. No. DE3014878; German OLS No. 2914099; German OLS No. 2825339; German OLS No. 2850251; French Pat. No. 2418472; Nakatani et al, "A Binocular Stereoscopic Display System for Endocardiography", *IEEE Trans. on Biom. Engr.,* vol. BME-26, No. 2 (February 1979), pp. 65–68; Talbert, "An 'Add-on' Modification for Linear Array Real-Time Ultrasonic Scanners to Produce 3 Dimensional Displays", *Conference: Ultrasonics International, Brighton, England* (June 28–30, 1977), pp. 57–67; Itoh et al, "A Computer-Aided Three-Dimensional Display System for Ultrasonic Diagnosis of a Breast Tumour", *Ultrasonics,* vol. 17, no. 6 (November 1979), pp. 261–268; Hoshino et al, "Microprogrammable Ultrasonic Image Processor and its Applications to Image Manipulation", *SPIE,* vol. 314 (Digital Radiography—1981), pp. 354–361; Ito et al, "Real Time Display Unit Achieves 3D Ultrasonic Diagnoses", *JEE,* vol. 16, no. 155 (November 1979), pp. 64–69; Wells, "Ultrasound 3D Techniques—Display of Three-Dimensional Data", *Biomedical Ultrasonics,* Academic Press (1977), pp. 248–252; and Nathan, "High Resolution Endocardiography", *NASA Tech. Briefs,* vol. 4, no. 1 (Spring 1979), p. 81.

The ultrasonic arrangements, devices and systems described in the aforementioned patents and articles are characterized by certain disadvantages. For example, ultrasonic arrangements, devices and systems of the prior art failed to take advantage of theories relating to texture and visual perception, as well as binocular perception. Such theories and the related theoretical techniques are disclosed in the following two articles: "Texture and Visual Perception", by Bela Julesz, *Scientific American,* February 1965, pages 38–48; and "The Resources of Binocular Perception", by John Ross, *Scientific American,* March 1976, pages 80–86.

Related to the latter observation is the further observation that ultrasonic arrangements, devices and systems of the prior art failed to take advantage of the advanced state of computer and data processing technology, and specifically failed to take advantage of the savings in hardware which can be achieved by development and adoption of sophisticated data processing/programming techniques for processing ultrasonic system data to derive reconstructed image data for the three-dimensional display of three-dimensional images of objects scanned by the three-dimensional imaging system.

DISCLOSURE OF INVENTION

The present invention relates to a three-dimensional imaging system for obtaining a three-dimensional image of an object scanned by the imaging system.

More specifically, one embodiment of the three-dimensional imaging system of the present invention comprises a source arrangement for sequentially transmitting ultrasonic energy toward an object in successive directions in a first scanning plane, and then repeating the sequential transmission of ultrasonic energy toward the object in the successive directions in successive scanning planes parallel to the first scanning plane, a detector arrangement for receiving energy reflected from the object and converting the reflected energy to electrical signals, and a processor connected to the detector arrangement for processing the electrical signals to develop reconstructed image data relating to the object scanned. In particular, the detector arrangement is disposed in an image plane displaced from the object being scanned and divided into a left image plane and a right image plane, the reconstructed image data being developed as a result of operation of the processor to derive forward projections of the object onto the left image plane and the right image plane to develop a first image and a second image, respectively, the first and second images forming a stereo pair. The system further comprises a display unit for displaying the first and second images compositely, thus displaying the three-dimensional image of the object.

In a further embodiment of the three-dimensional imaging system of the present invention, the source arrangement sequentially transmits ultrasonic energy from a given point toward the object in successive directions in a first scanning plane, and then repeats the sequential transmission of the ultrasonic energy toward the object in successive directions in successive scanning planes, each successive scanning plane having an angular orientation, measured at the given point of transmission and with respect to the first scanning plane, which is greater than the angular orientation of any preceding scanning plane, as measured at the given point of transmission and with respect to the first scanning plane. Energy reflected from the object is converted to electrical signals by the detector arrangement, and then the processor processes the electrical signals to develop reconstructed image data by deriving forward projections of the object onto a left image plane and a right image plane to develop a first image and a second image, respectively, the latter forming a stereo pair of images for composite display on a display unit.

Thus, in accordance with the teachings of the invention, either a plurality of source-detector pairs, one for each scanning plane, can be arranged in a line contained within the image plane, and can be arranged to scan the object in a first scanning plane and in successive, parallel scanning planes, respectively, or a single source-detector pair can be disposed at a point (for example, a point of intersection between the image plane and the first scanning plane), and can be arranged to scan the object in the first scanning plane and in successive scanning planes having increasing angular orientations with respect to the first scanning plane.

In addition, scanning in each scanning plane can be accomplished either by a single source and a single detector, or by a pair of sources and a corresponding pair of detectors, or by a single source and a pair of detectors.

In a further embodiment of the three-dimensional imaging system, a source arrangement sequentially transmits ultrasonic energy toward an object in successive directions in a first scanning plane, defining a generally pie-shaped sector scan having a central axis, the central axis lying within the first scanning plane and extending from the point of transmission to the perimeter of the sector scan. The source arrangement is then rotated about the central axis of the sector scan by a given angular amount, and the source arrangement then transmits ultrasonic energy toward the object in successive directions in a second scanning plane angularly oriented at the central axis with respect to the first scanning plane. Transmission is repeated in subsequent scanning planes having successively larger angular orientations measured at the central axis with respect to the first scanning plane. A detector arrangement receives energy reflected from the object and converts the reflected energy to electrical signals, and a processor processes the electrical signals to develop reconstructed image data relating to the object scanned, as previously described with respect to the foregoing embodiments.

Finally, significant savings in scanning time with respect to each scanning plane can be achieved in each of the above embodiments by providing a source which, rather than sequentially scanning in different directions within a given scanning plane, simultaneously transmits scanning signals of different respective frequencies in different respective directions within a given scanning plane.

Therefore, it is a primary object of the present invention to provide a three-dimensional imaging system for obtaining a three-dimensional image of an object being scanned.

It is an additional object of the present invention to provide a three-dimensional imaging system wherein a source arrangement sequentially transmits ultrasonic energy toward an object being scanned in successive directions in a first scanning plane, and repeats the sequential transmission of ultrasonic energy toward the object in successive directions in successive scanning planes parallel to the first scanning plane.

It is an additional object of the present invention to provide a three-dimensional imaging system wherein a source arrangement sequentially transmits ultrasonic energy toward an object being scanned in successive directions in a first scanning plane, and repeats the sequential transmission of ultrasonic energy toward the object in successive directions in successive scanning planes, the successive scanning planes having increasing angular orientations, as measured at the point of transmission, with respect to the first scanning plane.

It is an additional object of the present invention to provide a three-dimensional imaging system wherein a source arrangement transmits ultrasonic energy toward an object being scanned in successive directions in a first scanning plane, and repeats the sequential transmission of ultrasonic energy toward the object in successive directions in successive scanning planes, each successive scanning plane being angularly rotated about a common central axis with respect to the immediately preceding scanning plane.

It is an additional object of the present invention to provide a three-dimensional imaging system wherein a source arrangement transmits ultrasonic signals having different respective frequencies in different respective directions toward the object in a first scanning plane, and repeats the transmission of ultrasonic signals having different respective frequencies toward the object in successive scanning planes.

It is an additional object of the present invention to provide a three-dimensional imaging system having a source arrangement which comprises a plurality of source-detector pairs, one for each scanning plane.

It is an additional object of the present invention to provide a three-dimensional imaging system having a source arrangement comprising a single source-detector pair for performing ultrasonic scanning in a first scanning plane and successive scanning planes, the successive scanning planes having increasing angular orientations with respect to the first scanning plane.

It is an additional object of the present invention to provide a three-dimensional imaging system having a source arrangement comprising, in a given scanning plane, a single source and a single detector.

It is an additional object of the present invention to provide a three-dimensional imaging system having a source arrangement comprising, for a given scanning plane, first and second source-detector pairs.

It is an additional object of the present invention to provide a three-dimensional imaging system having a source arrangement comprising, for a given scanning plane, a single source and a pair of detectors.

The above and other objects that will hereinafter appear, and the nature of the invention, will be more clearly understood by reference to the following description, the appended claims, and the accompanying drawings.

BEST MODE FOR CARRYING OUT THE INVENTION

The invention will now be more fully described with reference to FIGS. 1A–1C, which are utilized to discuss binocular perception theory as it relates to the present invention.

Figure 1A:
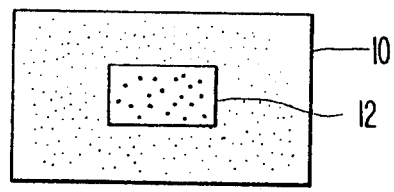
FIGS. 1A–1C are graphical illustrations used to describe binocular perception theory as it relates to the present invention.

FIG. 1A depicts a front view of two planes 10 and 12, each containing a random dot pattern. FIG. 1B is a top view of the two planes 10 and 12, wherein it is seen that the plane 12 is located in front of the plane 10. Also seen in FIG. 1B are left and right image planes 14 and 16, which can be thought of as corresponding to the image planes formed by the retinae of left and right eyes of a person viewing the two planes 10 and 12. In FIG. 1B, the dotted lines represent forward projections of the patterns, contained on planes 10 and 12, respectively, onto image planes 14 and 16, respectively.

Figure 1B:
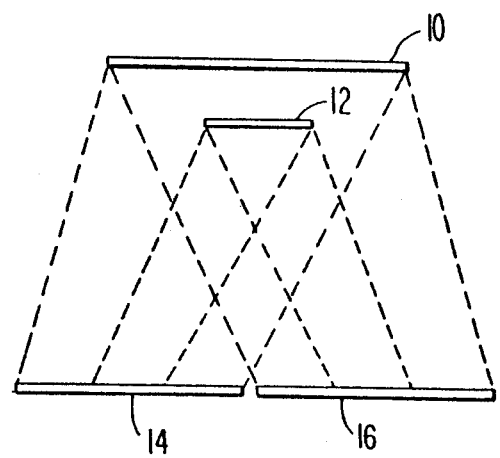
Figure 1C:
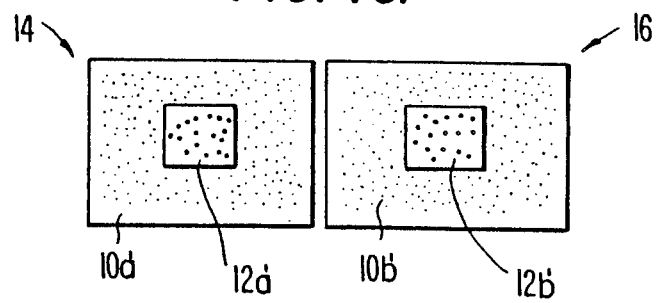

Turning to FIG. 1C, that figure depicts the projections, onto image planes 14 and 16, respectively, of the images contained on plane 10 and 12, respectively, of FIG. 1B. The projections of the pattern contained on plane 10 onto image planes 14 and 16, respectively, are designated by reference numerals $10a'$ and $10b'$, respectively, whereas the projections of the pattern contained on plane 12 onto image planes 14 and 16, respectively, are designated by reference numerals $12a'$ and $12b'$, respectively.

If the random dot patterns contained on planes 10 and 12 are viewed monocularly, only a two-dimensional perception results. That is, the monocular perception of the random dot patterns contained on planes 10 and 12 of FIG. 1A will correspond to one or the other of the monocular images $10a'$, $12a'$ or $10b'$, $12b'$ appearing on image planes 14 and 16, respectively, of FIG. 1C. However, if the random dot patterns on planes 10 and 12 of FIG. 1A are viewed binocularly, the stereo pair of images designated 14 and 16, as seen in FIG. 1C, will result.

In terms of human viewing of the patterns contained on planes 10 and 12, the human brain acts as a processor and processes the stereo pair of monocular images so as to form, in the "mind's eye", a three-dimensional image of planes 10 and 12. Thus, a human who views planes 10 and 12 binocularly will perceive plane 12 as being displaced vertically (in the third dimension) with respect to plane 10.

The present invention exploits the latter theory in the development of an ultrasonic imaging system which has minimal hardware by virtue of the fact that sophisticated programming techniques are employed to process stereo images of reflected ultrasonic energy so as to reconstruct a three-dimensional image of an object scanned ultrasonically.

Figure 2A:
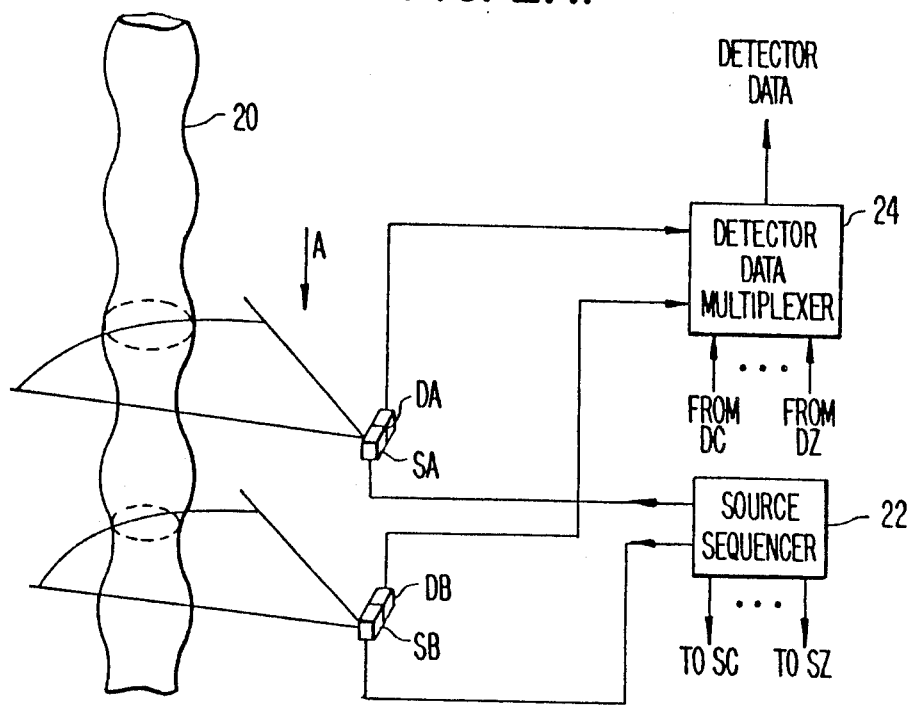
FIG. 2A is a diagrammatic representation of one embodiment of the present invention, employing parallel scanning planes.

FIG. 2A depicts a first embodiment of the present invention. As seen therein, a plurality of sources SA, SB, . . . and detectors DA, DB, . . . are arranged in an image plane displaced from an object 20 to be scanned. Each of the sources SA, SB, . . . is connected to a source sequencer 22, which is a conventional sequencing device for activating each of the ultrasonic sources SA, SB, . . . in sequence to scan the object 20. Thus, source SA will scan the object 20 during a first scanning cycle, source SB will scan the object 20 during a second scanning cycle, and so forth.

Figure 2B:
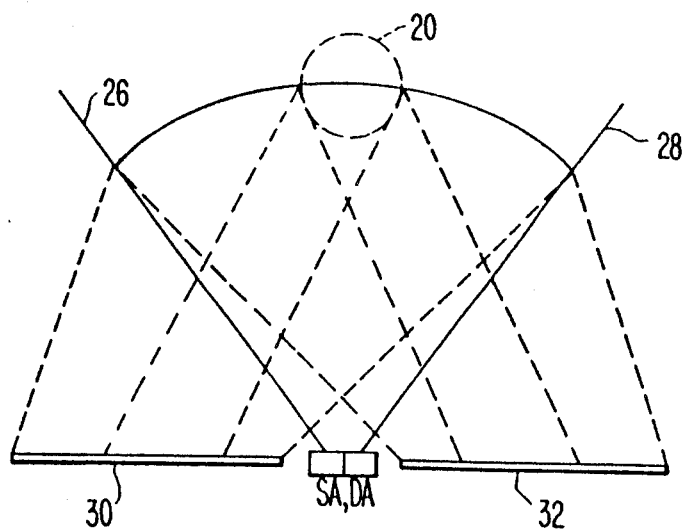
FIG. 2B is a top view of the embodiment of FIG. 2A, as seen along arrow A in FIG. 2A.

Turning to FIG. 2B, which is a top view of the embodiment of FIG. 2A, as viewed along arrow A in FIG. 2A, scanning of the object 20 by each source (for example, source SA) consists of the transmission of ultrasonic energy in a first direction 26, followed by successive transmissions of ultrasonic energy in directions displaced by increasing angular amounts from direction 26 until transmission in direction 28 is achieved. Movement of each source SA, SB, . . . can be achieved in the simplest case by manually moving the sources SA, SB, . . . , but preferably each source SA, SB . . . is connected to and rotatably driven by a conventional motor MA, MB, . . . . As a further preference, motors MA, MB, . . . are controlled by movement commands from a computer (such as image processor 72 of FIG. 7 discussed below). In accordance with well-known ultrasonic scanning techniques, the ultrasonic energy will be reflected from material, such as material of the object 20, appearing in the scan path. Such reflected ultrasonic energy will be detected by detectors DA, DB, . . . , such detectors providing detection outputs to a detector data multiplexer 24.

Detector data multiplexer 24 is a conventional device which polls each of detectors DA, DB, . . . in succession, and in correspondence to the scanning cycles of sources SA, SB, . . . . Data from the detectors DA, DB, . . . , as multiplexed by detector data multiplexer 24, is provided as a detector data output to the image processing system associated with the present invention, as described subsequently with reference to FIG. 7.

Figure 2C:
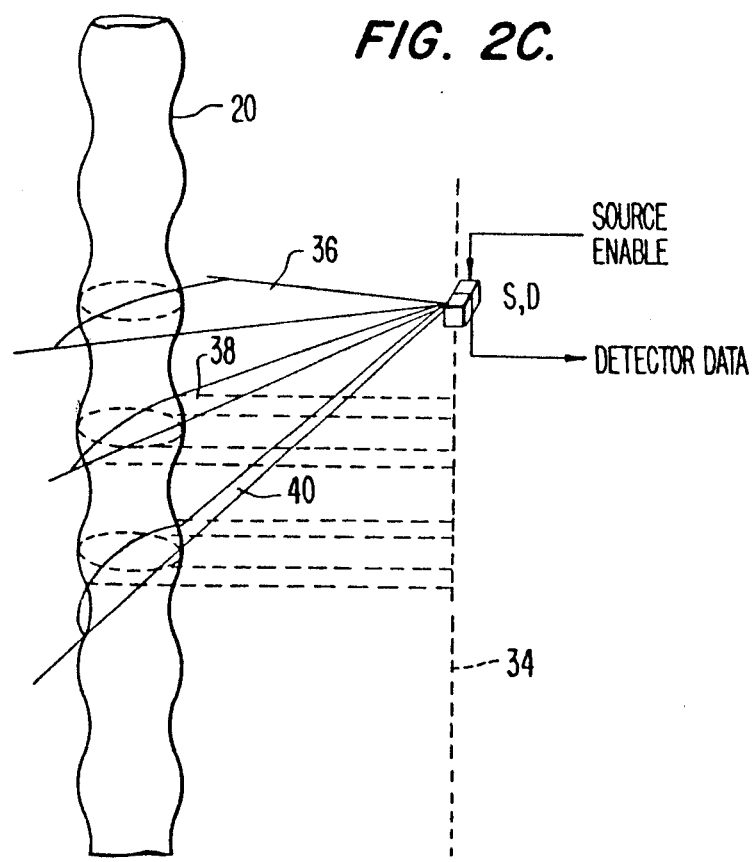
FIG. 2C is a diagrammatic representation of a further embodiment of the invention, employing a first scanning plane and successive scanning planes having increasing angular orientations, measured at the point of transmission, with respect to the first scanning plane.

FIG. 2C is a diagrammatic representation of a second embodiment of the invention, wherein a single source S and a single detector D are disposed in an image plane, designated by reference numeral 34, in opposition to an object 20 to be scanned. In this embodiment, ultrasonic scanning of the object 20, by means of the transmission of ultrasound signals by source S, takes place in a first scanning plane 36, and is then repeated in successive scanning planes 38, 40, and so forth, each successive scanning plane being angularly displaced from the first scanning plane 36 by increasing angular amounts. In the simplest case, scanning in successive directions in a first scanning plane and in successive directions in successive scanning planes angularly oriented with respect to the first scanning plane can be accomplished by manual movement and reorientation of the source S. However, preferably, a conventional motor (such as a stepper motor) M capable of two-dimensional movement of the source S is provided. Of course, two one-dimensional motors can be employed, one for scanning within a given scanning plane, the other for movement from one scanning plane to the other. As a further preference, motor M is controlled by movement commands from a computer (such as image processor 72 of FIG. 7 discussed below).

Energy reflected from the object 20 as a result of each scanning cycle is received by the single detector D, which provides detector data to the image processing system, which will be described in more detail below with reference to FIG. 7. At this juncture, it is sufficient to state that the image processing system processes the detector data so as to develop data representing forward projections of the object 20 onto image plane 34, such forward projections being represented by the horizontal dotted lines perpendicular to the image plane 34 in FIG. 2C.

Figure 3:
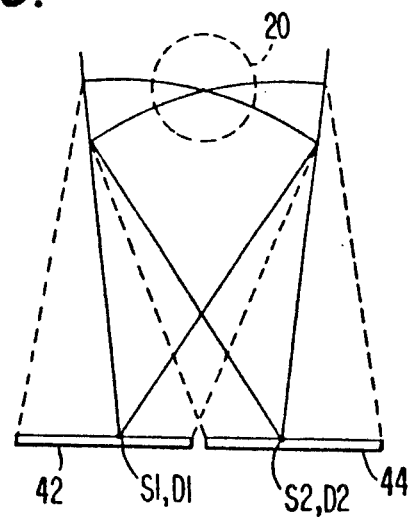
FIG. 3 is a top view of a further embodiment of the invention, employing two source-detector pairs.

FIG. 3 is a diagrammatic representation of a further embodiment of the invention, employing two source-detector pairs. Specifically, a source S1 and a detector D1 form a source-detector pair positioned at the center of a left image plane 42, while a source S2 and a detector D2 form a second source-detector pair positioned at the center of a right image plane 44.

In operation, each source-detector pair scans the object 20 with ultrasound energy during a given scanning cycle. Reflected energy is received by detectors D1 and D2, respectively, and corresponding detector data are provided to the image processing system. The image processing system processes the detector data, in a manner to be discussed in more detail below, so as to develop image data representing forward projections of the object 20 in both the left plane 42 and right plane 44, the image data in these two planes forming a stereo pair.

It is to be recognized that this embodiment of the invention, involving two source-detector pairs, can be utilized in combination with the embodiment of FIG. 2A, in which case there would be two source-detector pairs for each parallel scanning plane, or can be utilized in combination with the embodiment of FIG. 2C, in which case there would be two source-detector pairs positioned in image plane 34 (see FIG. 2C), which source-detector pairs would generate successive pairs of scans corresponding to scans 36, 38, 40 and so forth, each pair of scans being angularly displaced with respect to the preceding pair of scans. Moreover, the embodiment of FIG. 3 can also be utilized in combination with the embodiment of FIG. 9 (discussed below), in which case there would be two source-detector pairs positioned in image plane 100 (see FIG. 9), which source-detector pairs would generate successive pairs of scans corresponding to scans OACB, OA'CB', and so forth, each pair of scans being angularly oriented with respect to preceding pairs of scans.

Figure 4:
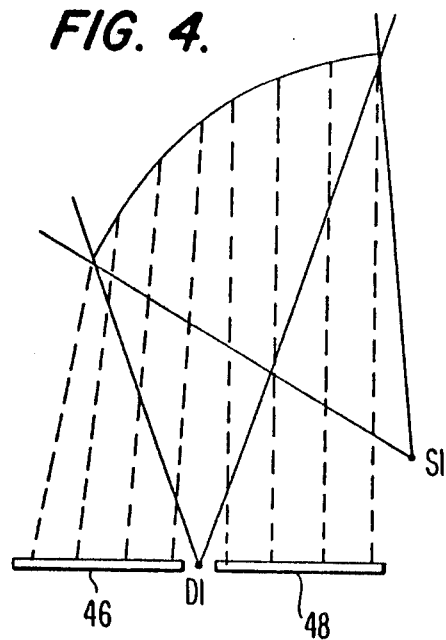
FIG. 4 is a top view of a further embodiment of the invention, employing a single source-detector pair.

FIG. 4 is a diagrammatic representation of a further embodiment of the invention, wherein a single source-detector pair, comprising source S1 and detector D1, is employed. In this embodiment, the source S1 is located at a different position with respect to the position of detector D1, as shown in FIG. 4. When ultrasonic energy is transmitted by source S1 toward the object 20, the resulting reflected energy is received by detector D1, which provides detector data to the image processing system, the latter processing the detector data to develop image data representing forward projections onto the left plane 46 and right plane 48 of FIG. 4.

Figure 9:
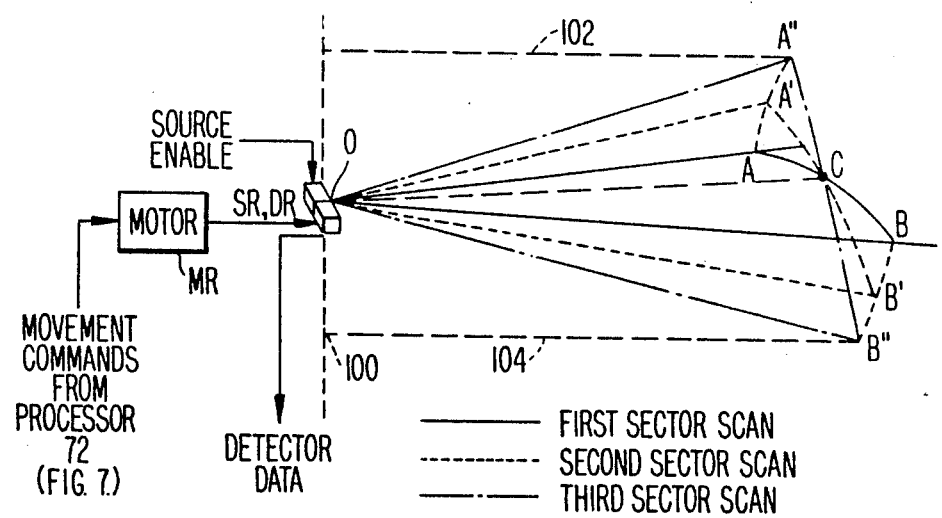
FIG. 9 is a diagrammatic representation of a further embodiment of the invention, employing a first scanning plane and successive scanning planes having increasing angular orientations, measured along a central common axis, with respect to the first scanning plane.

Again, it is to be recognized that this embodiment of the invention can be combined with the embodiments of FIGS. 2A, 2C or 9, such that there would be one source-detector pair for each parallel scanning plane (as in FIG. 2A), or one source-detector pair for generating the angularly displaced scans 36, 38, 40, etc. (as in FIG. 2C), or one source-detector pair for generating the angularly displaced scans OACB, OA'CB', etc. (as in FIG. 9 discussed below).

Figure 5:
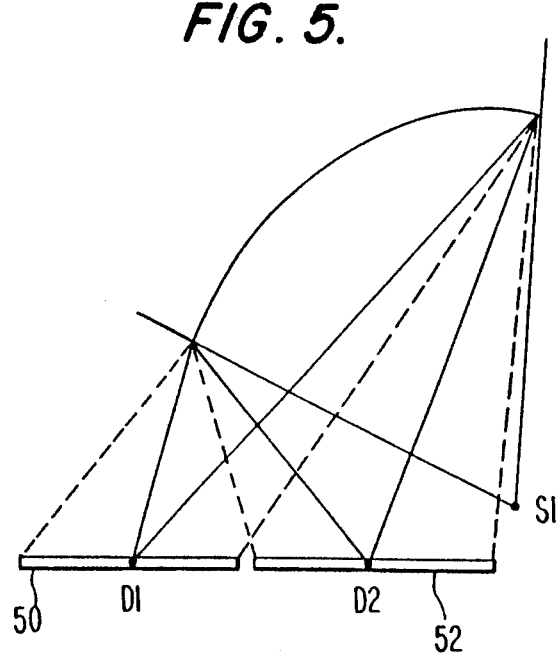
FIG. 5 is a top view of a further embodiment of the invention, employing a single source and a pair of detectors.

FIG. 5 is a diagrammatic representation of a further embodiment of the invention, involving the employment of a single source S1 for transmitting ultrasonic energy toward the object 20, in combination with two detectors D1 and D2, each detector being positioned at the center of a respective one of image planes 50 and 52. Again, this embodiment of FIG. 5 can be utilized in combination with either the embodiment of FIG. 2A, the embodiment of FIG. 2C, or the embodiment of FIG. 9 (discussed below).

Figure 6A:
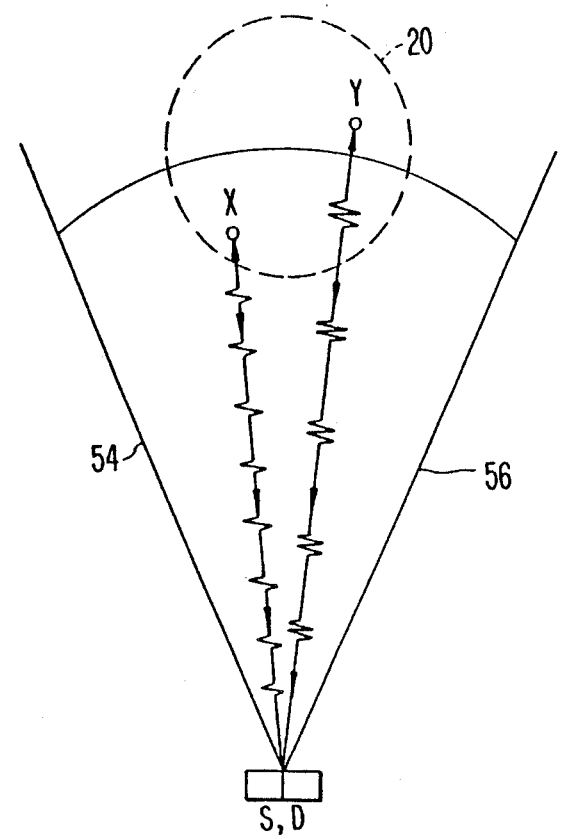
FIG. 6A is a top view of a further embodiment of the invention, employing the transmission of different respective frequencies in different respective directions within a given scanning plane.

FIG. 6A is a diagrammatic representation of a further embodiment of the invention, wherein a single source-detector pair S, D is employed to generate, on a simultaneous basis, a plurality of scanning beams or signals having different respective frequencies in different directions. Thus, a predetermined plurality of beams disposed at predetermined angular intervals from left scanning beam 54 through right scanning beam 56 are generated simultaneously, with each respective scanning beam having a different respective frequency.

When energy is reflected, the reflected energy is received by the detector D, and corresponding detector data are provided to the image processing system. Thus, even though the ultrasonic beams or signals are generated simultaneously, and the corresponding detector data are received virtually simultaneously, reflected energy corresponding to one ultrasonic transmission can be distinguished from reflected energy corresponding to the other ultrasonic transmissions by virtue of the difference in frequency. It is to be recognized that this multi-frequency technique can be employed in any of the embodiments described herein so as to effect simultaneous ultrasound beam transmission. This results in an extremely short scanning cycle, with overall savings in operational time, as well as achievement of the advantage of superior responsiveness of the overall system.

Figure 6B:
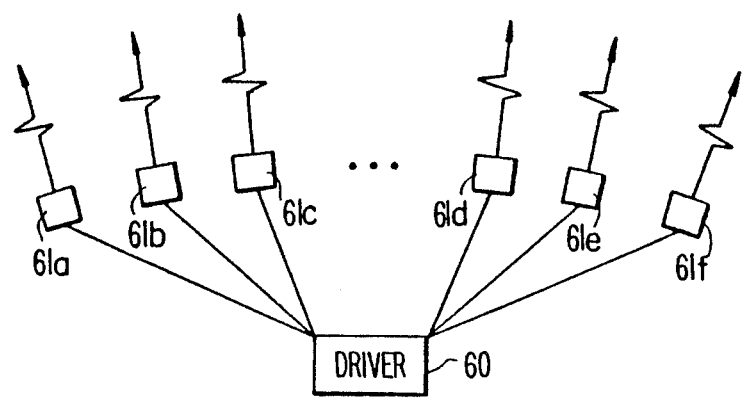
FIGS. 6B and 6C are source arrangements and FIG. 6D is a detector arrangement for implementing the embodiment of FIG. 6A.
Figure 6C:
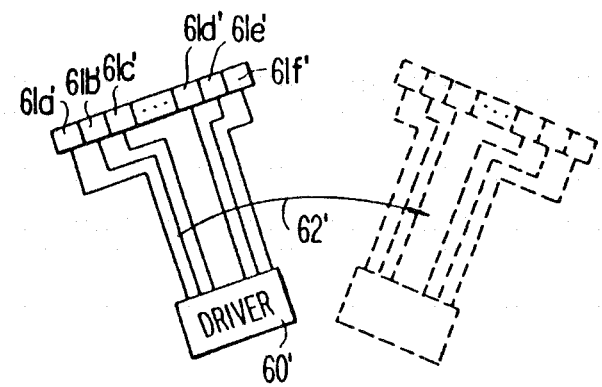

It is to be appreciated that various source-detector arrangements may be utilized in implementing the multi-frequency technique described above. For example, as shown in FIG. 6B, a plurality of crystal oscillators 61a-61f can be arranged in an angular array around a driver 60, the latter successively activating each oscillator for generating successive signals of different frequencies in respective directions. Alternatively, as shown in FIG. 6C, an arrangement of a plurality of oscillators 61a'-61f' can be connected in common to a driver 60', and can be arranged to rotate in an angular direction as indicated by the arrow 62, the driver 60' being operated at each successive angular position to activate a respective one of the oscillators 61a'-61f', thus generating signals of different frequencies in different respective directions. As indicated in FIG. 6C, any conventional rotating mechanism 63 can be used to rotate the oscillators 61a-61f' through the path indicated by arrow 62'. For example, oscillators 61a'-61f' could be mounted on and belt-driven along a track (not shown) by a conventional motor.

Figure 6D:
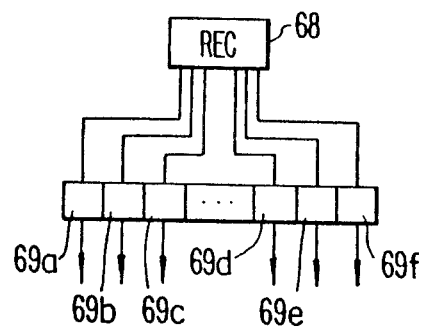

With respect to the detection of the signals of different frequencies, a detector arrangement such as that shown in FIG. 6D can be employed. Such a detector arrangement comprises a receiver 68 connected in common to a plurality of filters 69a-69f, each filter having a respective output for providing its respective analog data output to the image processor (discussed below). In this manner, the image processor is able to differentiate signals of different frequency as received from different respective scan directions.

Figure 7:
FIG. 7 is a block diagram of the three-dimensional imaging system of the present invention.

FIG. 7 is a block diagram of the image processing system employed with the present invention. As seen therein, the image processing system of the present invention basically comprises an analog-to-digital converter (ADC) 70, an image processor 72, and a storage and display unit 74.

The ADC 70 is a standard or conventional analog-to-digital converter which converts the analog detector data received from the detector(s) to digital form for input to the image processor 72.

The image processor 72 is a conventional digital computer which is programmed to process the digital detector data in such a manner (to be described below) as to compute the image data representing forward projections of the reflected ultrasound energy (and thus of the objects encountered by the transmitted ultrasonic energy) onto the image plane(s), as mentioned above. As indicated elsewhere herein, image processor 72 preferably generates movement commands for controlling the movement of sources SA, SB of FIG. 2A, source S of FIG. 2C, and source SR of FIG. 9.

The storage and display unit 74 is a conventional storage and display unit which, in response to the digital image data (or coordinate data) developed by the image processor 72, in correspondence to the computed forward projection data, displays in two-dimensional form a virtual three-dimensional image representing the object 20 scanned by the ultrasonic scanning system described above. Such a virtual three-dimensional image can be viewed by a trained person (e.g., a radiologist) without any viewing old. However, a viewing aid can be used, if desired.

It is to be noted that the ADC 70 can be implemented by any conventional analog-to-digital converter. The image processor 72 can be implemented by any conventional image processor, such as the IP 5000 manufactured by DeAnza Systems. The storage and display unit 74 can be any conventional storage and display unit employed in image processing systems, such as the RAMTEK display unit manufactured by Ramtek Corporation.

Figure 8A:
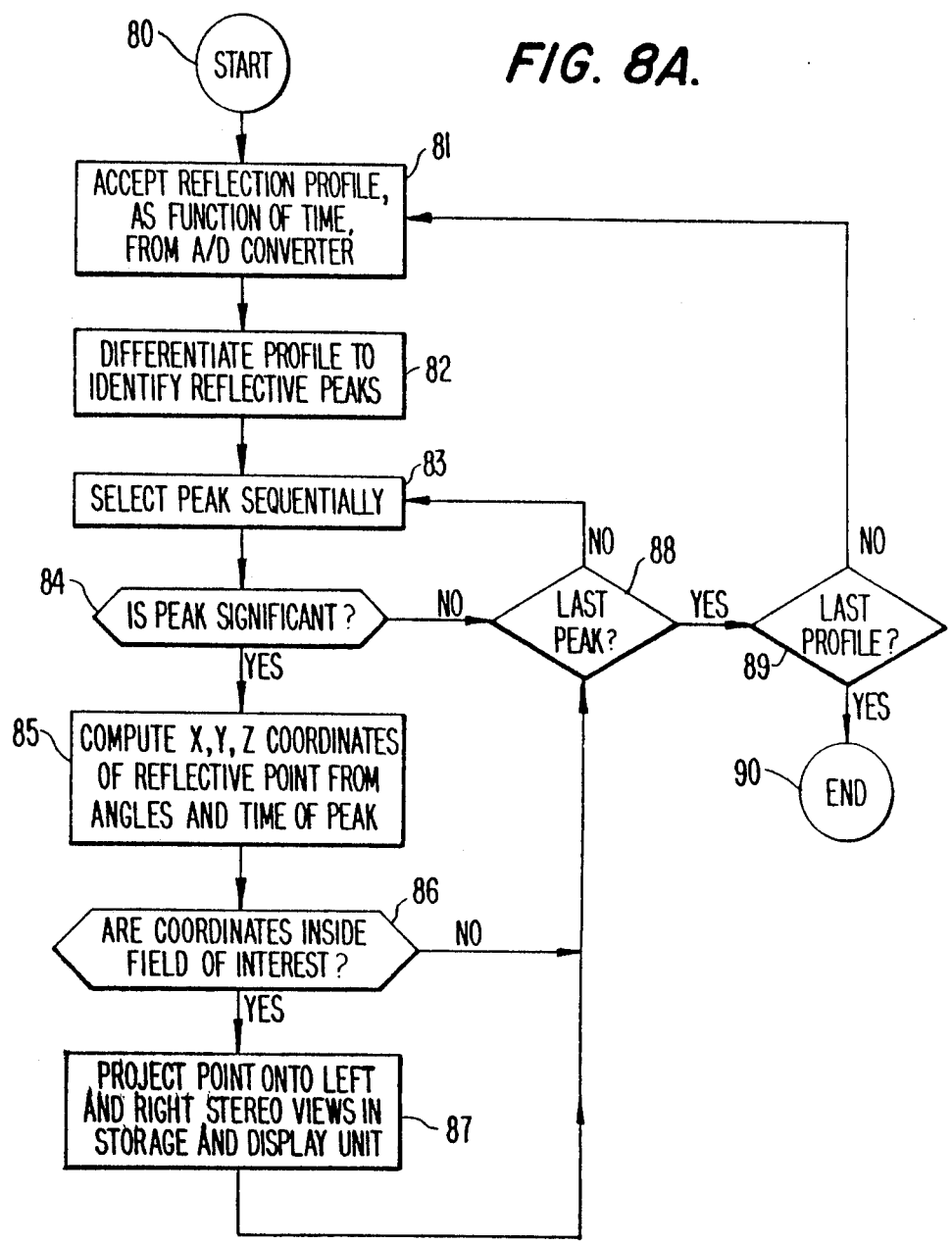
FIG. 8A is a general flowchart of the operations performed by the image processor 72 of FIG. 7, while FIGS. 8B thru 8D contain a more detailed flowchart of the operations performed by the image processor 72 of FIG. 7.

FIG. 8A is a general flowchart of program operations performed by the image processor 72 in processing detection data in accordance with the present invention. Referring to FIG. 8A, the operations of the image processor 72 are as follows. When processing is to start (block 80), the image processor 72 accepts a reflection profile as a function of time from the ADC 70 (block 81). This reflection profile corresponds to the reflection or non-reflection of ultrasonic signals from the scanned object over a predetermined interval subsequent to transmission of the ultrasonic signal in a given direction toward the object. The reflection profile data are differentiated to identify reflective peaks (block 82). Each peak identified within the reflection profile is selected sequentially (block 83), and a decision is made as to whether or not the peak is significant (block 84). Significance of a peak is determined based on various well-known threshold-related or parameter-related techniques, as would be obvious to one of skill in the art.

If the peak is determined to be significant, the X, Y and Z coordinates of the reflective point are computed from the angles and time interval (duration between transmission and reception of a signal reflected from the object being scanned) of each peak (block 85). Computations are performed in accordance with the following well-known vector equations:

$$\vec{X} = \frac{kT}{2} \cdot \cos \phi_i \cdot \vec{I};$$

$$\vec{Y} = \frac{kT}{2} \cdot \cos \phi_j \cdot \vec{J}; \text{ and}$$

$$\vec{Z} = \frac{kT}{2} \cdot \cos \phi_k \cdot \vec{K};$$

where k is a scaling factor, T is the time interval of the reflected beam, $\phi_i$, $\phi_j$ and $\phi_k$ are angles of the beam measured with respect to unit vectors $\vec{I}$, $\vec{J}$ and $\vec{K}$.

Once the computation of the X, Y and Z coordinates is carried out, a decision is made as to whether or not the coordinates are inside the field of interest, using further well-known techniques of analytic geometry (block 86). More specifically, as the person of skill in the art of analytic geometry will appreciate, any portion of space can be represented by defining limiting surfaces in terms of X, Y and Z components, and any point in space can be repesented by the aforementioned vector equations. It is then a matter of geometric calculations to determine whether or not the point coordinates fall within the operation of space or the field of interest. If the coordinates are inside the field of interest, the computed coordinates are used to project the detected point onto left and right stereo views in the storage and display unit 74 (block 87).

If (referring to block 84) the peak is determined not to be significant, or if (referring to block 86) the coordinates are determined not to be inside the field of interest, or if (referring to block 87) a point is projected onto the left and right stereo views in the storage and display unit 74, a further determination as to whether or not the last peak has been sequentially processed is made (block 88). If the last peak has not been processed, the next peak is sequentially selected (block 83), and processing continues (blocks 84–87). If the last peak has been processed (block 88), a determination as to whether or not the last profile has been accepted is made (block 89).

If the last profile has not been accepted, the processor accepts another reflection profile (block 81) corresponding to another ultrasonic transmission, and processing of that reflection profile proceeds. If, on the other hand, the last profile has been accepted (block 89), the processor 72 ceases operation (block 90).

Figure 8B:
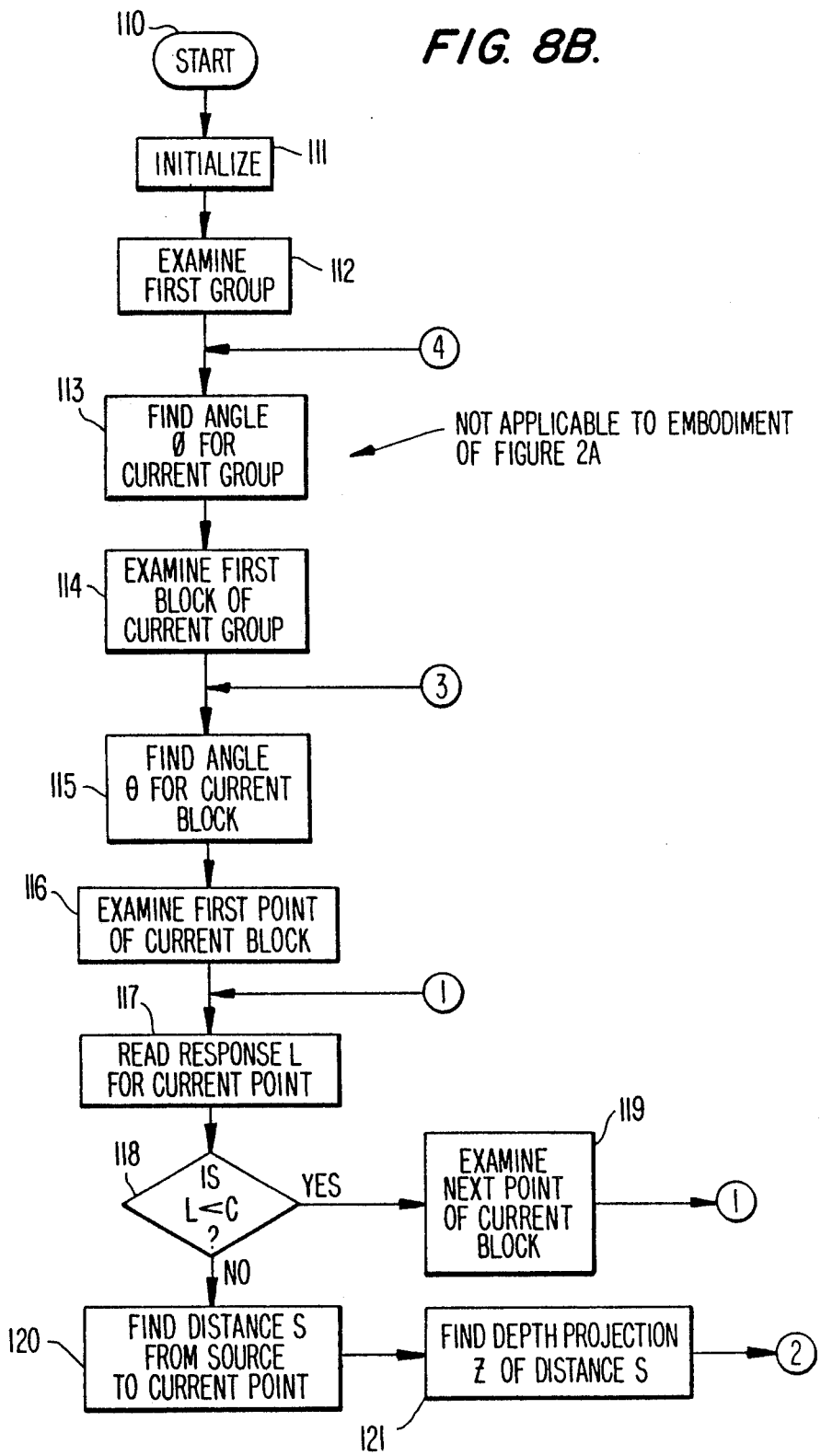
Figure 8C:
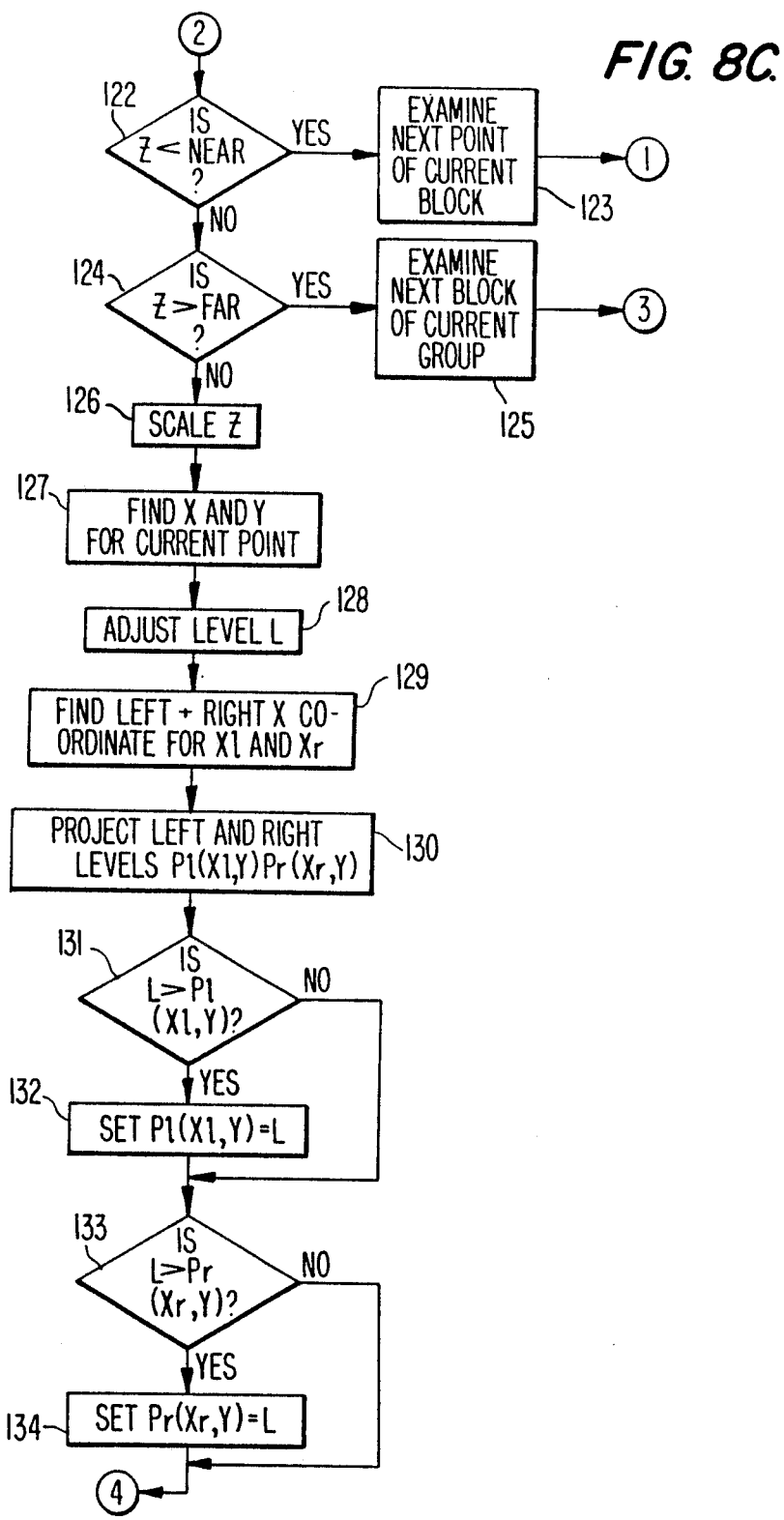
Figure 8D:
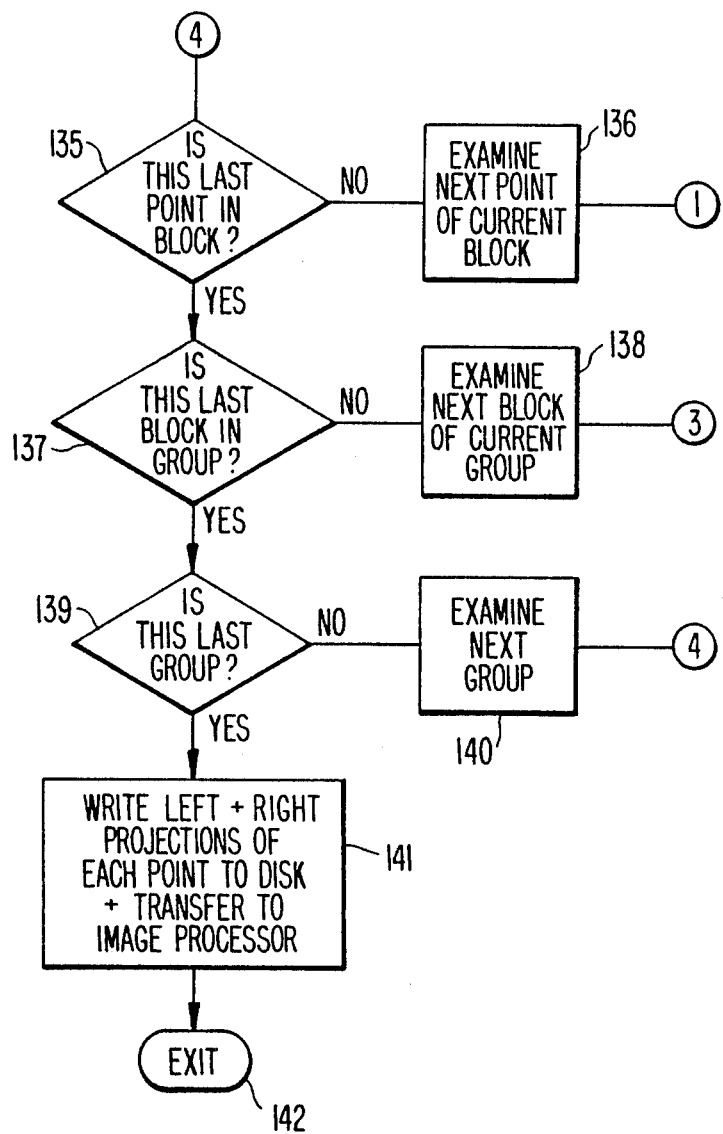

FIGS. 8B thru 8D are detailed flowcharts of the operations performed by the image processor 72 of FIG. 7. The detailed flowcharts of FIGS. 8B thru 8D describe the operations of the image processor 72 of FIG. 7 as performed with respect to implementation of each of the embodiments of FIGS. 2A, 2C and 9 with one exception; block 113 of FIG. 8B does not apply to the embodiment of FIG. 2A.

Prior to discussing the operations shown in FIGS. 8B thru 8D, a few preliminary comments would be helpful. As previously explained, in the embodiment of FIG. 2A, the source SA transmits a pulse in a given direction in a first scanning plane. After the passage of a predetermined interval of time, the detector DA is activated and remains activated for a given period of time, during which the detector DA performs periodic sampling to determine whether or not a reflection has been received. Detection of a reflection early in the sampling period indicates the existence of a nearby object, while detection of a reflection later in the sampling period indicates the presence of a distant object. The collection of data obtained by detector DA during a given sampling period (referred to above as a "reflection profile") is called a "block". Each block contains data corresponding to responses along a given constant direction, and each block begins with readings corresponding to points at a minimum distance from the source, followed by readings corresponding to points spaced by successive equal increments from the minimum distance.

Once a given block of data has been received, the source SA rotates by a given angular increment so that it is oriented along a different direction, whereupon a further ultrasonic pulse is transmitted in that direction, and the detector DA again detects responses during a given sampling period. The collection of blocks of data for a given scanning plane is called a "group". Thus, the number of groups of data equals the number of parallel scanning planes in the embodiment of FIG. 2A.

In the embodiment of FIG. 2C, the block of data is detected by detector D for each direction (in the scanning planes 36, 38 and 40) in which an ultrasonic pulse is transmitted by the source S. Accordingly, the number of groups of data equals the number of scanning planes 36, 38, 40, . . . in the embodiment of FIG. 2C, and the number of blocks of data in each group equals the number of directions in which ultrasonic pulses are transmitted by the source S.

Turning to the flowchart of FIG. 8B, the operations commence (block 110) with an initialization procedure (block 111) in which various input parameters are entered. Specifically, a scaling factor S is employed in order to keep the reconstructed stereo images within the available field. A minimum distance NEAR and a maximum distance FAR are used to eliminate objects too close to and too far from, respectively, the source. An attenuation factor A is used to reduce the response levels of points further from the source relative to response levels for points closer to the source; in this manner, objects along the same general scanning direction can be distinguished in that objects nearer to the source are displayed as a brighter image and objects further from the source are displayed as dimmer images. A stereo angle a, measured from either side of a center line which splits the image plane into a left stereo image and a right stereo image, is also entered. A cutoff value C, used to eliminate noise in the detected scan signals, is also entered.

As mentioned above, during scanning, data corresponding to each point along a direction of scan for each line of scan within each of the scanning planes are collected, point by point. During the initialization (block 111), such data are read and processed by the processor 72 of FIG. 7 to find the maximum response level $L_{max}$. A level scaling factor F is then computed by means of the equation $F=255/L_{max}$ so as to keep the reconstruction within the limits of the array processor 72 of FIG. 7. As a final step of the initialization procedure, a memory array in the processor 72 of FIG. 7 or associated therewith is completely cleared to zeros. This memory array can be considered as being divided into two portions, one for holding data results corresponding to the left projection and the other portion for holding data results corresponding to the right projection of the object being scanned. Each portion consists of a two-dimensional array, $P_l(X_l,Y)$ for the left projection data and $P_r(X_r,Y)$ for the right projection data, wherein $X_l$ and $X_r$ are the X-coordinates of a point in the left and right image planes, respectively, and Y is the Y-coordinate of a point in the left or right image plane.

Continuing with the flowchart of FIG. 8B, the first group of data is examined (block 112), and the angle $\phi$ (the angle of inclination of the scanning plane) is computed for the first group of data. This operation is not applicable to the embodiment of FIG. 2A since, in that embodiment, the scanning planes are mutually parallel, but the operation is applicable to the embodiment of FIG. 2C, wherein each succeeding scanning plane is angularly oriented with respect to the preceding scanning plane. In FIG. 2C, if scanning plane 36 is considered to be a reference scanning plane, than the first group of data will have a value of $\phi$ equal to 0°.

The first block of data in the first group is then examined (block 114), and an angle $\theta$ for that block is computed (block 115). The angle θ is the angle between any given direction of scanning in a given scanning plane and a reference direction.

Continuing with the flowchart, the first point of the first block of data in the first group is then examined (block 116) and the response L for that point is read (block 117) and compared to the cutoff value C (block 118). If the response L is less than the cutoff value C, the next point of the current block of data is examined (block 119), and a return to block 117 is executed. If the response L is not less than the cutoff value C, the distance s from the source to the point in question is computed by the equation $s = s_{min} + (N_p - 1) * \Delta s$, where $s_{min}$ is a minimum distance from the source to the first point of a block, $\Delta s$ in the incremental distance between successive points in the block, $N_p$ is the number of points in each block, and the * indicates multiplication (block 120). The depth projection Z of the distance s, that is, the z-coordinate of the point detected, is then computed (block 121). In the embodiment of FIG. 2A, the Z-coordinate is given by the equation $Z = s^* \cos \theta$; in the embodiment of FIG. 2C, the Z-coordinate is given by the equation $Z = s^* \cos \theta^* \cos \phi$.

Referring to the flowchart of FIG. 8C, the Z value is then examined (blocks 122 and 124). If Z is less than NEAR, the next point of the current block is examined (block 123), and a return to block 117 of FIG. 8B is executed. If Z is greater than FAR, the next block of the current group is examined (block 125), and a return to block 115 of FIG. 8B is executed. If neither of these two conditions is met, the value of Z is scaled by means of the equation $Z = S^*Z$ where S is the scaling factor (block 126). The X and Y coordinates for the current point are then computed (block 127). In the embodiment of FIG. 2A, the coordinates are given by the equations $X = S^*s^* \sin \theta$ and Y=a constant value equal to the distance between the scanning plane in question and the reference scanning plane. In the embodiment of FIG. 2C, the coordinates are given by the equations $X = S^*s^* \sin \theta$ and $Y = S^*s^* \sin \phi^* \cos \theta$.

The level L of the response detected at the point in question is then adjusted (block 128) by the equation $L = F^*L^*A^{(Z-NEAR)}$ where F is the level scaling factor computed during initialization, L (on the right side of the equation) is the unadjusted response level, A is the attenuation factor and NEAR is the minimum distance parameter entered during initialization. The left and right X coordinates are then computed by the equation $Xl = X^* \cos a - Z^* \sin a$ and $Xr = X^* \cos a + Z^* \sin a$, where a is the stereo angle, values Xl and Xr being rounded (block 129). The left and right levels are then projected (block 130), that is to say, a storage location in the left image plane memory array corresponding to the coordinates (Xl, Y) is identified and a storage location in the right image plane memory array corresponding to the coordinates (Xr, Y) is identified. The adjusted level L is compared to that stored in the left and right image plane memory arrays (blocks 131 and 133) and, if the adjusted level L is greater in either case, the particular storage location is set to a value equal to L (blocks 132 and 134).

Referring to the remainder of the flowchart in FIG. 8D, a determination as to whether or not the last point in the block is being processed is made (block 135) and, if not, the next point of the current block is examined (block 136) and a return to block 117 of FIG. 8B is executed. If the last point in the block has been examined, a determination as to whether or not the last block in the group has been examined is made (block 137) and, if not, the next block of the current group is examined (block 138), and a return to block 115 of FIG. 8B is executed. If the last block in the group has been examined, a determination as to whether or not the last group has been examined is made (block 139) and, if not, the next group is examined (block 140), and a return to block 113 of FIG. 8B is executed. If the last group has been examined, the left and right projections of each point in each block of data in each group are written to disk where they may be retrieved by the processor 72 for display thereby (block 141). The routine is then ended by execution of an exit function (block 142). Of course, in connection with the display of the left and right images on a composite three-dimensional display, conventional control of the image processor 72 can be implemented in order to adjust the contrast (mean and width), and the image can be photographed and mounted if desired, such being within the capability of conventional hardware available in the marketplace at the present time.

FIG. 9 is a diagrammatic representation of a further embodiment of the invention, employing a first scanning plane and successive scanning planes having increasing angular orientations, measured along a central common axis, with respect to the first scanning plane. As seen in FIG. 9, a single source SR and a single detector DR are disposed in an image plane 100 in opposition to an object located generally in the vicinity of points A, B and C. For the sake of precluding over-complication of FIG. 9, the object to be scanned is not depicted therein, but it is to be understood that the object is similar to the object 20 of FIG. 2C, and in fact the object (not shown) in FIG. 9 is disposed, with respect to the source SR and detector DR, in a position identical to the position of the object 20 in FIG. 2C.

As seen in FIG. 9, the ultrasonic energy source SR is positioned at a point O in image plane 100, and the source SR is connected to a motor MR. The motor MR is similar to the motor M in FIG. 2C in that the motor MR is capable of rotating the source SR in two dimensions. Of course, two motors—one for each dimension of movement—can be employed. The motor MR is actuated as a result of the reception of movement commands from the processor 72 (FIG. 7). Generation of ultrasonic energy by the source SR takes place as a result of the reception, by source SR, of a SOURCE ENABLE command from the processor 72 (FIG. 7).

In accordance with this embodiment of the invention, ultrasonic scanning of the object, by means of the transmission of ultrasound signals by the source SR, takes place in a first scanning plane defined by points O, A, C and B. It will be noted from FIG. 9 that the first sector scan (indicated by a solid line joining points O, A, C and B in FIG. 9) is bisected by a central axis OC.

Once the first sector scan has taken place, the source SR is rotated by a small angular amount about the axis OC, and a second sector scan (indicated by short dotted lines connecting points O, A', C and B') takes place. The plane OA'CB' of the second sector scan is angularly oriented with respect to the plane OACB of the first sector scan, as measured at the common central axis OC.

Once the second sector scan is completed, the source SR is again rotated a small angular amount about the central common axis OC, and scanning is repeated in a third scanning plane OA"CB" angularly oriented with respect to the two preceding scanning planes, as measured at the common central axis OC. Rotation of the source SR and scanning in subsequent scanning plane take place until the source SR has been rotated through 180°.

In this manner, "slices" of the object are scanned in succession, each of the "slices" having the axis OC in common. Collection of all "slices" scanned constitutes a scanned volume of the object.

As was the case in the embodiment of FIG. 2C, energy reflected from the object as a result of each sector scan is received by the detector DR, which provides detector data to the image processing system of FIG. 7. The image processing system of FIG. 7 processes the detector data so as to develop data representing forward projections of the object onto image plane 100. Such forward projections are exemplified by the projection lines 102 and 104 in FIG. 9, the latter projection lines being associated with the third sector scan (along points A"CB"). Other projection lines have been omitted from FIG. 9 in order to avoid over-complicating the figure.

Figure 10:
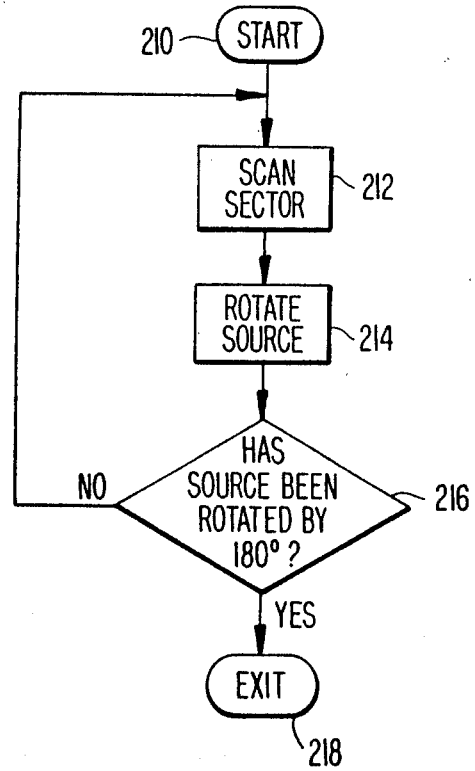
FIG. 10 is a flowchart of additional operations performed by the image processor 72 of FIG. 7 in accordance with the embodiment of FIG. 9.

FIG. 10 is a flowchart of operations performed by the image processor 72 of FIG. 7 in effecting rotational movement of the source SR. When sector scanning is to begin, the procedure commences (block 110) by sector scanning of the first sector (block 112), after which the source is rotated (block 114), and a decision is made as to whether or not the source has been rotated through 180°. If rotation through 180° has not yet taken place, a return loop is executed by the processor 72 of FIG. 7, and a subsequent sector scan takes place (block 112). This procedure continues until it is determined that the source has been rotated through 180° (block 116), at which point the scanning procedure terminates (block 118).

With reference to FIG. 9, it should be noted that, preferably, the source SR and detector DR are combined into a single conventional transducer element having transmission circuitry and detection circuitry corresponding to the functions of the source SR and detector DR depicted diagrammatically in FIG. 9. Accordingly, in the preferred embodiment, the source SR and detector DR can rotate in unison during each cycle of rotation of the source SR.

Referring to the flowchart of FIGS. 8B thru 8D, which have been discussed in detail above, each of the operations disclosed in that flowchart is performed by the image processor 72 of FIG. 7 in conjunction with implementation of the third embodiment of the invention, as shown in FIG. 9. Referring to FIG. 8B, in block 113, the angle $\phi$ between the first scanning plane OACB in FIG. 9 and any subsequent scanning plane, such as plane OA'CB' in FIG. 9, is computed. The depth projection Z (i.e., the Z-coordinate) of any point (block 121) is provided by the equation $Z = S^* s^* \cos \theta$. The X and Y coordinates of any point (block 127) are provided by the equations $X = S^* s^* \sin \theta^* \sin \phi$ and $Y = S^* s^* \sin \theta^* \cos \phi$. Otherwise the operations described in the flowchart of FIGS. 8B thru 8D are identical to those implemented for the second embodiment of FIG. 2C.

It should be recognized that the ultrasonic sources SA, S1, S2, SR, and so forth, referred to above, can be implemented by any conventional source of ultrasonic energy, as is well-known to those of skill in the art. Such ultrasonic energy sources are to be adapted to provide for ultrasonic scanning of an object in terms of (1) the successive transmission of ultrasonic beams in successively incremented angular directions (as described above with respect to FIGS. 2A-2C and 9), (2) the generation of successive sector scans occurring in successive scanning planes, the scanning planes having increasing angular orientations with respect to a first scanning plane (as described above with respect to FIGS. 2C and 9), and (3) the transmission of a plurality of ultrasonic beams of different respective frequencies in different angular directions (as described above with reference to FIGS. 6A-6D).

In addition, it is to be recognized that the detectors DA, D1, D2, DR, and so forth, described above, can be implemented by any conventional detector(s) capable of detecting reflected ultrasonic energy and providing corresponding analog detector data to an image processing system, provided that such detectors are adapted to provide the functions of the present invention, as described above.

As is well-known to those of skill in the art, the sources and detectors described above can be provided in the form of transducer elements, arranged either singularly or in transducer arrays. With respect to the provision of transducer arrays, it is also to be recognized that phased arrays of transducer can be employed without departing from the scope of the present invention.

While preferred forms and arrangements have been shown in illustrating the invention, it is to be clearly understood that various changes in detail and arrangement may be made without departing from the spirit and scope of this disclosure.

I claim:

1. A three-dimensional imaging system for obtaining a three-dimensional image of a three-dimensional object, comprising:

source means disposed at a given point displaced from the three-dimensional object for performing a first sector scan of the three-dimensional object by transmitting ultrasonic energy from the given point toward the three-dimensional object in successive directions in a first scanning plane, each successive direction having an angular orientation, with respect to a reference direction in the first scanning plane, which is greater then the angular orientation with respect to the reference direction of any preceding direction, one of the successive directions defining an axis between the given point and the three-dimensional object, said source means performing successive sector scans of the three-dimensional object of repeating the transmission of ultrasonic energy from the given point toward the three-dimensional object in successive directions in successive scanning planes, wherein each successive scanning plane has an angular orientation, measured along the axis and with respect to said first scanning plane, which is greater than the angular orientation of any preceding scanning plane as measured along the axis and with respect to the first scanning plane;

detector means for receiving reflected energy reflected from material of the three-dimensional object, and for converting said reflected energy to electrical signals; and processor means connected to said detector means for receiving said electrical signals, and for processing said electrical signals to develop reconstructed image data of the three-dimensional object, said processor means generating control signals;

wherein said detector means is disposed in an image plane displaced from the three-dimensional object, the image plane being perpendicular to the first scanning plane, the image plane being divided into a left image plane and a right image plane, said reconstructed image data developed by said processor means corresponding to forward projections of the three-dimensional object into said left image plane to form a first image and into said right image plane to form a second image, said first and second images forming a stereo pair;

said system further comprising processor-controlled rotating means connected to said processor means and responsive to said control signals from said processor means for rotating said source means about said axis by a certain angular value after each said sector scan is performed, and display means for displaying said first and second images compositely, thereby displaying said three-dimensional image of the three-dimensional object.

2. The system of claim 1, wherein said detector means comprises a first ultrasonic transducer disposed in said image plane on a first line perpendicular both to said first scanning plane and to said forward projections, and a second ultrasonic transducer disposed in said image plane on a second line perpendicular both to said first scanning plane and to said forward projections.

3. The system of claim 2, wherein said first line divides said left image plane into left and right portions, and said second line divides said right image plane into left and right portions, said first ultrasonic transducer being approximately centrally disposed within said left image plane and said second ultrasonic transducer being approximately centrally disposed within said right image plane.

4. The system of claim 2, wherein said source means comprises an ultrasonic source disposed in said image plane on said first line, said system further comprising additional source means disposed at an additional point displaced from the three-dimensional object for transmitting ultrasonic energy from the additional point toward the object in additional successive directions in said first scanning plane, each additional successive direction having an angular orientation, with respect to an additional reference direction in said first scanning plane, which is greater than the angular orientation of any preceding direction, and for repeating the transmission of said ultrasonic energy toward said object in additional successive directions in said successive scanning planes, said additional source means comprising an additional ultrasonic source disposed in said image plane on said second line.

5. The system of claim 1, further comprising additional source means disposed at an additional point displaced from the three-dimensional object for transmitting ultrasonic energy from the additional point toward the three-dimensional object in additional successive directions in said first scanning plane, each additional successive direction having an angular orientation, with respect to an additional reference direction in said first scanning plane, which is greater than the angular orientation of any preceding direction, and for repeating the transmission of said ultrasonic energy toward the three-dimensional object in additional successive directions in said successive scanning planes.

6. The system of claim 1, wherein said source means comprises means for transmitting ultrasonic signals in said different directions toward said three-dimensional object, said ultrasonic signals having different respective frequencies, one frequency for each of said different directions.

7. The system of claim 1, wherein said processor-controlled rotating means comprises motor means for rotating the source means in a first dimension defining each sector scan and in a second dimension defining the angular orientation between each sector scan and the first sector scan.

8. The system of claim 7, wherein said motor means comprises a first motor for rotating said source means in the first dimension and a second motor for rotating the source means about said axis in the second dimension.

9. A three-dimensional imaging system for obtaining a three-dimensional image of a three-dimensional object, comprising:

source means disposed at a given point displaced from the three-dimensional object for performing a first sector scan of the three-dimensional object by transmitting ultrasonic energy from the given point toward the three-dimensional object in successive directions in a first scanning plane, each successive direction having an angular orientation, with respect to a reference direction in the first scanning plane, which is greater than the angular orientation with respect to the reference direction of any preceding direction, one of the successive directions defining an axis between the given point and the three-dimensional object, said source means performing successive sector scans of the three-dimensional object by repeating the transmission of ultrasonic energy from the given point toward the three-dimensional object in successive directions in successive scanning planes, wherein each successive scanning plane has an angular orientation, measured along the axis and with respect to said first scanning plane, which is greater than the angular orientation of any preceding scanning plane as measured along the axis and with respect to the first scanning plane;

detector means for receiving reflected energy reflected from material of the three-dimensional object, and for converting said reflected energy to electrical signals; and processing means connected to said detector means for receiving said electrical signals, and for processing said electrical signals to develop reconstructed image data of the three-dimensional object;

wherein said detector means is disposed in an image plane displaced from the three-dimensional object, the image plane being perpendicular to the first scanning plane, the image plane being divided into a left image plane and a right image plane, said reconstructed image data developed by said processing means corresponding to forward projections of the three-dimensional object into said left image plane to form a first image and into said right image plane to form a second image, said first and second images forming a stereo pair;

said system further comprising display means for displaying said first and second images compositely, thereby displaying said three-dimensional image of the three-dimensional object;

wherein said detector means comprises a first ultrasonic transducer disposed in said image plane on a first line perpendicular both to said first scanning plane and to said forward projections, and a second ultrasonic transducer disposed in said image plane on a second line perpendicular both to said first scanning plane and to said forward projections; and wherein said source means comprises an ultrasonic source disposed in said image plane on said first line, said system further comprising additional source means disposed at an additional point displaced from the three-dimensional object for transmitting ultrasonic energy from the additional point toward the object in additional successive directions in said first scanning plane, each additional successive direction having an angular orientation, with respect to an additional reference direction in said first scanning plane, which is greater than the angular orientation of any preceding direction, and for repeating the transmission of said ultrasonic energy toward said object in additional successive directions in said successive scanning planes, said additional source means comprising an additional ultrasonic source disposed in said image plane on said second line.

* * * * *

UNITED STATES PATENT AND TRADEMARK OFFICE
CERTIFICATE OF CORRECTION

PATENT NO. : 4,798,210
DATED : January 17, 1989
INVENTOR(S) : Robert S. Ledley

It is certified that error appears in the above—identified patent and that said Letters Patent is hereby corrected as shown below:

Claim 1, column 16, line 50, "of" (first occurrence)

should be "by".

Signed and Sealed this

Thirtieth Day of May, 1989

Attest:

DONALD J. QUIGG

Attesting Officer

Commissioner of Patents and Trademarks